> # 3,006,887
> Patented Oct. 31, 1961

3,006,887
PROTECTIVE COATINGS FOR POLYESTER RESINS
Blaine O. Schoepfle, Niagara Falls, and Paul Robitschek, Wilson, N.Y., assignors to Hooker Chemical Corporation, Niagara Falls, N.Y., a corporation of New York
No Drawing. Filed Aug. 27, 1956, Ser. No. 606,211
13 Claims. (Cl. 260—45.95)

This invention relates to compositions for the protection of resins, and more particularly refers to coating compositions which when applied to the surface of halogen-containing polyester resins will protect them from the deleterious effects of weathering, and which additionally will have good adherence to the surface of the resinous articles so protected. This invention also embraces the halogen-containing polyester resin articles having such coatings.

The halogen-containing polyester resins have found wide acceptance commercially because of their many desirable physical properties, particularly because they are flame-retardant. The halogen-containing polyester resins are subject to deterioration and discoloration when exposed to natural outdoor conditions for prolonged periods of time. This deterioration and discoloration is in part due to the present of ultra-violet light in the sun's radiation and in part due to temperature, humidity and other climatic conditions. A method has been proposed for diminishing the effects of weathering by incorporating within the halogen containing polyester resin an ultra-violet light absorbing material. This method is quite costly and does not offer sufficient protection to the surfaces of the resinous article for many applications.

It is an object of the present invention to provide a method for protecting halogen-containing polyester resins from the effects of weathering. It is a further object of this invention to provide a method, for protecting polyester resins from the effects of weathering, which can be easily applied after the resinous article has been fabricated or molded. It is still further an object of this invention to protect polyester articles at a relatively low cost. Further objects will become apparent from the following discussion.

It has now been found that a halogen-containing polyester resin article may be produced which is protected from the effects of weathering by providing as a coating thereupon a composition which is derived from a synthetic resin, a solvent therefor, and a 2-hydroxybenzophenone in an amount at least one percent by weight of the synthetic resin. It has been additionally found that when at least 10 percent of the 2-hydroxybenzophenone is used the coating will be more adherent to the halogen containing polyester resin when it is exposed to ultra-violet light and other weathering conditions. It has been further found that when a small amount of the 2-hydroxybenzophenone from about 0.1 percent to about 10 percent is additionally incorporated into the halogen containing polyester resin itself, even better adhesion of the coating is obtained.

The resinous coating composition is generally prepared in the form of a lacquer by mixing the ingredients according to the methods commonly used in the paint and varnish art. This lacquer may then be brushed, sprayed, or applied in any other manner to the halogen-containing article. When the solvent evaporates a dry durable weather resistant coating remains which will prevent the discoloration and weathering of the halogen containing polyester resin article. Whereas the present composition may be applied to various types of resinous materials such as polystyrene, polyvinyl chloride, and various polyesters for protection against weathering, it is particularly effective when applied to halogen-containing polyester resins. One of the most important of these is a polyester resin comprised of the adduct of hexachlorocyclopentadiene with maleic anhydride, additional maleic anhydride to provide unsaturation, a glycol and styrene or other suitable cross linking monomers.

Halogenated polyester resins embraced within the scope of this invention which contain halogen chemically-combined in the polyester resin per se may be prepared by employing a halogen-containing polycarboxylic acid and/or a halogen-containing polyhydric alcohol in the esterification reaction and/or a halogen-containing monomeric olefin in the cross-linking or copolymerization reaction. In copending application Serial No. 308,921, filed September 10, 1952, now U.S. Patent 2,779,701, in which one of the present applicants is co-applicant with still another applicant, there is described the preparation of flame retardant polyester resinous compositions containing halogen chemically-combined in the polyester resin. Another specific type of polyester resin which contains halogen in chemical combination in the polyester resin may be prepared by employing a tetrachlorophthalic anhydride or other similar acid, or anhydrides containing chlorine, in the esterification reaction. Polyester resins containing halogen in an additive or filler are best illustrated by those having chlorinated paraffin intermixed therein usually for the purpose of rendering the final resin flame retardant. Halogen containing polyester resins containing between 15 percent and 35 percent chlorine are especially preferred in practicing this invention. It is to halogen-containing polyester resins of the types described aforesaid that the present invention is more particularly concerned.

Various resinous materials may be used as a basis for the coating formulations, the requirement being that they are transparent and dry to a tack-free film. Among such materials are a preferred class selected from the groups consisting of the polymeric forms of acrylic and methacrylic acid esters, polystyrene, polyethylene, polyvinyl chloride, or modified alkyd resins and mixtures thereof. These may be used in conjunction with suitable solvents when the 2-hydroxybenzophenone or the amount of it employed is not miscible or soluble in the resin. The preferred formulations contain about 10 to 30 percent of resin, and 70 to 90 percent solvent. The preferred coating resin is polymethyl methacrylate since it is very stable to light, and forms a very adherant coating when used in the manner herein disclosed. The ratio of the resin to the solvent is not critical but will be governed by the method of application and the nature of the resin. For instance if the coating is to be applied by spraying a larger percentage of solvent may be used.

Among the 2-hydroxy benzophenones which may be used in the present invention are 2,4-dihydroxybenzophenone; 2,2'4 - trihydroxy - 4' - methoxybenzophenone; 2,2' - dihydroxy - 4,4' - dimethoxybenzophenone; 2,2', 4,4' - tetrahydroxybenzophenone; 2 - hydroxy - 5 - chlorobenzophenone; 2 - hydroxy - 5,2' - dichlorobenzophenone; 2 - hydroxy - 5 - methyl - 2' - chlorobenzophenone; 2 - hydroxy - 5,3',4 - trichlorobenzophenone; 2 - hydroxy - 5 - methylbenzophenone; 2 - hydroxy - 2' - chlorobenzophenone; 2 - hydroxy - 5 - chlorobenzophenone-2'-carboxylic acid; 2-hydroxy-4-methoxybenzophenone; 2 - hydroxy - 4,4' - dimethoxybenzophenone; 2 - hydroxy - 4 - chlorobenzophenone; and the like.

The proportion of the 2-hydroxybenzophenone which may be employed in the coating of this invention may be varied between about one percent and about 50 percent by weight of the resin used. The amount used will be dictated by the properties desired. It has been found that as little as one percent stabilizer in the coating will give considerable protection to halogen containing polyester resin articles and is suitable for some purposes. However, in order to insure adequate adhesion of the coating to the halogen containing polyester resin articles, at least 10 percent 2-hydroxybenzophenone, based on the solids content of the coating resin, should be included within the coating. For optimum adhesion about 0.10 to about 10 percent of the 2-hydroxybenzophenone based on the weight of the halogen containing polyester resin of the article to be coated should be added to this halogen containing polyester resin in addition to the 10 percent or more added to the coating material. This combination will result in a halogen containing polyester resin article, whereon the coating is extremely well adhering.

Any suitable solvent which effects the mutual solubility of the resin and 2-hydroxybenzophenone may be employed. Among such materials are the aromatic type solvents such as toluene, xylene etc., the aliphatic ketones such as methyl ethyl ketone, acetone etc., chlorinated hydrocarbon type solvents such as chloroform, and carbon tetrachloride. The proportion of solvents to be employed is of course dictated by the results and viscosity desired. For example, if a thin or fluid coating material is desired or if the materials are difficultly soluble, relatively large proportions of solvent will be used.

When the 2-hydroxybenzophenone is used in amounts within the range wherein it is soluble, in the coating resin, the resulting coating will be transparent. When the limits of solubility are exceeded the resulting coating will be hazy since a portion of 2-hydroxybenzophenone will crystallize out. The limits vary from one 2-hydroxybenzophenone to another. For instance 2-hydroxy-4-methoxybenzophenone may be used in polymethyl methacrylate up to about 15 percent by weight of the resin to form transparent coatings. 2,2'-dihydroxy-4,4'-methoxybenzophenone may be used up to an amount of about 25 percent by weight of the total solid resin. Where transparency of the coating is not needed, amounts of the stabilizer greater than those falling within the range of solubility in the resin may be used for added protection.

The stabilized coatings of the present invention may generally be applied to any halogen-containing unsaturated polyester resin. It is most suitably employed, however, on chlorine-containing polyester resins, although bromine or fluorine containing or chloro-bromo, fluoro-bromo, fluoro-chloro or other mixed halogenated polyesters may also be advantageously coated. The preferred halogen containing polyester resin is one which is made by chemically combining an adduct of a hexahalo-cyclopentadiene, especially hexachlorocyclopentadiene and maleic anhydride with a glycol in the presence of additional maleic anhydride, cross-linking this polyester with styrene in the presence of a polymerization catalyst to form a cured chlorine-containing polyester resin. However, other chlorine-containing polyester resins such as those formed by the condensation of tetrachlorophthalic anhydride with suitable glycols and acids and subsequent curing with styrene may be used.

The following examples serve to illustrate the present invention but are not intended to limit the invention except as defined in the appended claims.

EXAMPLE 1

A weather resistant coating material was prepared by mixing together 10 grams polymethylmethacrylate, 15 grams methyl ethyl ketone, 45 grams toluene, 5 grams xylene, and 1.8 grams 2-hydroxy-4-methoxybenzophenone. The solid polymethylmethacrylate can be substituted by any of the number of polymethylmethacrylate solutions which are commercially available, such as those marketed by Rohm & Haas Co. under the trademark of Acryloid. After complete mixing of the solution of the various ingredients, the coating material was ready to be coated upon the halogen containing polyester panels.

Table I below shows various weather resistant coating lacquer formulations accompanied by observations with respect to their properties.

Table I

[Composition of coating lacquer (grams)]

| Example No. | Polymethyl methacrylate | Acetone | Methyl ethyl ketone | Toluene | Xylene | 2,2'-dihydroxy 4,4'-dimethoxy-benzophenone | 2-hydroxy-4-methoxy-benzophenone | Observations |
|---|---|---|---|---|---|---|---|---|
| 2 | 10 |  | 25 | 40 |  | 2.5 |  | (1) Pin holes—dries too fast. |
| 3 | 10 |  | 25 | 15 | 25 | 2.5 |  | (2) Much too slow drying. |
| 4 | 10 | 25 |  | 40 |  | 2.5 |  | (3) Pinholes. |
| 5 | 10 |  | 25 | 35 | 5 | 2.5 |  | (4) Fair film—some spray pattern, dries too fast. |
| 6 | 10 |  | 25 | 45 | 5 | 2.5 |  | (5) Good film—if high humidity, gives cloudy surface. |
| 7 | 10 |  | 25 | 45 | 5 |  | 2.5 | (6) Good film—if high humidity, gives cloudy surface. |
| 8 | 10 |  | 15 | 45 | 5 | 2.5 |  | (7) Good film. |
| 9 | 10 |  | 15 | 45 | 5 |  | 2.5 | (8) Good film—clouds after several days. |
| 10 | 10 |  | 15 | 45 | 5 |  | 1.8 | (9) Good film. |

The examples shown below in Table II demonstrate the advantages obtained by coating articles of resin containing the adduct of hexachlorocyclopentadiene and maleic anhydride with the weather resistant coating of the present invention. The glass reinforced panels used were 6" x 12" and 65 thousandths of an inch thick. In carrying out the test, three General Electric RS-lamps were mounted symmetrically 5" above a turn-table which was covered with white glass cloth. The samples to be tested were placed on the glass cloth and the turn-table rotated at about 35 r.p.m. Each sample was exposed for a total of 125 hours. The resulting color of the unprotected panel and the coated panel were judged visually. In every case the base panel was made of a polyester resin comprised of 1,4,5,6,7,7-hexachlorobicyclo-(2.2.1)-5-heptene-2,3-dicarboxylic acid, maleic anhydride, ethylene glycol, and styrene. Two different stabilizers were used, 2-hydroxy-4-methoxybenzophenone and 2,2'-dihydroxy-4,4'-dimethoxybenzophenone.

Table II

| Example | Coating stabilizer percent | Discoloration of unprotected panel | Discoloration of coated panel |
|---|---|---|---|
| 11 | 0.0 | Very bad | Very bad. |
| 12 | 10.0 A | do | Slight. |
| 13 | 10.0 B | do | Do. |
| 14 | 25.0 A | do | No change. |
| 15 | 25.0 B | do | Do. |
| 16 | 50.0 B | do | Do. |

NOTE.—A = 2-hydroxy-4-methoxybenzophenone. B = 2,2'-dihydroxy-4,4'-dimethoxybenzophenone.

The following examples in Table III below demonstrate the results obtained from outdoor weathering tests. The panels in every case were tested by outdoor exposure in Florida at a 45 degree incline facing south continuously during the months of October through April. The samples were examined and rated by visual observation. The coatings were prepared in a manner similar to Example 1. The base panel in every case was the same as that used in obtaining the data in Table II.

percent to about 10 percent by weight of said unsaturated resinous reaction product, and an adherent, weather resistant, transparent coating, said coating comprising (1) a material selected from the group consisting of the polymeric forms of acrylic and methacrylic acid esters, poly- Table III

| Example number | Percent stabilizer | | Discoloration | | Loss of luster | | Erosion | | Pealing, coated |
|---|---|---|---|---|---|---|---|---|---|
| | Base panel | Coating | Uncoated | Coated | Uncoated | Coated | Uncoated | Coated | |
| 17 | Unstab. | 25.0 A | Bad | Medium | Definite | No change | Very slight | No change | No change. |
| 18 | 0.25 A | 25.0 A | Medium | Very slight | do | do | No change | do | Do. |
| 19 | 0.25 A | 25.0 B | do | do | do | do | do | do | Do. |
| 20 | 0.5 A | Unstab. | Definite | Definite | do | Definite | do | do | Definite. |
| 21 | 0.5 A | 10.0 A | do | None | do | No change | Very slight | do | No change. |
| 22 | 0.5 A | 10.0 A | Medium | No change | do | do | do | do | Do. |
| 23 | 0.5 A | 5.0 A | do | Very slight | do | do | No change | do | Do. |
| 24 | 0.5 A | 25.0 A | Definite | None | do | do | Very slight | do | Do. |
| 25 | 0.5 A | 25.0 B | do | do | do | do | do | do | Do. |

NOTE.—A=2-hydroxy-4 methoxybenzophenone. B=2,2'-dihydroxy-4,4'-dimethoxybenzophenone.

The data shown in Table III above demonstrate that when an uncoated halogen containing polyester article is coated with weather resistant coating of the present invention, good color protection results, good luster protection results, good erosion protection results and good adhesion is obtained. The results also show that when small amounts of the 2-hydroxybenzophenone are incorporated in non-coated halogen containing polyester articles, practically no protection is offered. On the other hand it has been found that when a small amount of the 2-hydroxybenzophenone is incorporated in the halogen containing polyester article and additionally from 10 to 25 percent of the 2-hydroxybenzophenone is incorporated into the coating material, excellent protection is offered with respect to all properties, and extremely good adhesion of the coating to the halogen containing polyester article results.

It is to be understood that the above described experiments are simply illustrative of the application of the principles of the invention. Numerous other experiments may be readily devised by those skilled in the art which will embody the principles of the invention and fall within the spirit and scope thereof.

We claim:
1. A plastic article comprising a polymerized halogen-containing unsaturated resinous reaction product of a polybasic acid and a polyhydric alcohol and an adherent, weather resistant, transparent coating, said coating comprising (1) a material selected from the group consisting of the polymeric forms of acrylic and methacrylic acid esters, polystyrene, polyethylene, polyvinyl chloride and mixtures thereof and characterized by drying to a transparent, tack-free film and (2) a 2-hydroxybenzophenone in an amount between about one percent and about fifty percent by weight of said material.

2. An article according to claim 1 wherein said polymerized halogen-containing unsaturated resinous reactive product is the reaction product of (1) a polyhydric alcohol, (2) 1,4,5,6,7,7 - hexachlorobicyclo - (2.2.1) - 5 - heptene-2,3-dicarboxylic acid (3) a polycarboxylic compound containing aliphatic carbon to carbon unsaturation and (4) a polymerizable compound containing aliphatic carbon to carbon unsaturation.

3. An article according to claim 2 wherein said material is polymethylmethacrylate.

4. An article according to claim 3 wherein said 2-hydroxybenzophenone is present in an amount of at least 10 percent by weight of the polymethylmethacrylate.

5. A plastic article comprising a polymerized halogen-containing unsaturated resinous reaction product of a polybasic acid and a polyhydric alcohol containing in admixture, a 2-hydroxybenzophenone in an amount from 0.1 percent to about 10 percent by weight of said unsaturated resinous reaction product, and an adherent, weather resistant, transparent coating, said coating comprising (1) a material selected from the group consisting of the polymeric forms of acrylic and methacrylic acid esters, polystyrene, polyethylene, polyvinyl chloride and mixtures thereof and characterized by drying to a transparent, tack-free film and (2) a 2-hydroxybenzophenone in an amount between about one percent and about fifty percent by weight of said material.

6. An article according to claim 5 wherein said polymerized halogen-containing unsaturated resinous reaction product is a polymer comprised of the reaction product of (1) a polyhdric alcohol, (2) 1,4,5,6,7,7-hexachlorobicyclo-(2.2.1)-5-heptene-2,3-diccarboxylic acid (3) a polycarboxylic compound containing aliphatic carbon to carbon unsaturation, and (4) a polymerizable compound containing aliphatic carbon to carbon unsaturation.

7. An article according to claim 6 wherein said material is polymethyl methacrylate.

8. A plastic article comprising a polymerized reaction product of (1) a polyhydric alcohol, (2) 1,4,5,6,7,7-hexachlorobicyclo-(2.2.1)-5-heptene-2,3-dicarboxylic acid, (3) a polycarboxylic compound containing aliphatic carbon-to-carbon unsaturation, and (4) a polymerizable compound containing aliphatic carbon-to-carbon unsaturation; and an adherent, weather-resistant, transparent coating, said coating comprising (1) polymethylmethacrylate characterized by drying to a transparent, tack-free film, and (2) 2-hydroxy-4-methoxybenzophenone in an amount between about one percent and about fifty percent by weight of said polymethylmethacrylate.

9. A plastic article comprising a polymerized reaction product of (1) a polyhydric alcohol, (2) 1,4,5,6,7,7-hexachlorobicyclo-(2.2.1)-5-heptene-2,3-dicarboxylic acid, (3) a polycarboxylic compound containing aliphatic carbon-to-carbon unsaturation, and (4) a polymerizable compound containing aliphatic carbon-to-carbon unsaturation; and an adherent, weather-resistant, transparent coating, said coating comprising (1) polymethylmethacrylate characterized by drying to a transparent, tack-free film, and (2) 2,2'-dihydroxy-4,4'-dimethoxybenzophenone in an amount between about one percent and about fifty percent by weight of said polymethylmethacrylate.

10. A plastic article comprising a polymerized reaction product of (1) a polyhydric alcohol, (2) 1,4,5,6,7,7-hexachlorobicyclo-(2.2.1)-5-heptene-2,3-dicarboxylic acid, (3) a polycarboxylic compound containing aliphatic carbon-to-carbon unsaturation, and (4) a polymerizable compound containing aliphatic carbon-to-carbon unsaturation, containing in admixture 2-hydroxy-4-methoxybenzophenone in an amount from 0.1 percent to about ten percent by weight of said polymerized reaction product; and an adherent, weather-resistant, transparent coating, said coating comprising (1) polymethylmethacrylate, characterized by drying to a transparent, tack-free film, and (2) 2-hydroxy-4-methoxybenzophenone in an amount between about one percent and about fifty percent by weight of said polymethylmethacrylate.

11. A plastic article comprising a polymerized reaction product of (1) a polyhydric alcohol, (2) 1,4,5,6,7,7-hexachlorobicyclo-(2.2.1)-5-heptene-2,3-dicarboxylic acid, (3) a polycarboxylic compound containing aliphatic carbon-to-carbon unsaturation, and (4) a polymerizable compound containing aliphatic carbon-to-carbon unsaturation, containing in admixture 2,2′-dihydroxy-4,4′-dimethoxybenzophenone in an amount from 0.1 percent to about ten percent by weight of said polymerized reaction product; and an adherent, weather-resistant, transparent coating, said coating comprising (1) polymethylmethacrylate, characterized by drying to a transparent, tack-free film, and (2) 2,2′-dihydroxy-4,4′-dimethoxybenzophenone in an amount between about one percent and about fifty percent by weight of said polymethylmethacrylate.

12. An article according to claim 11 wherein said 2,2′-dihydroxy-4,4′-dimethoxybenzophenone is present in an amount at least 10 percent of said polymethylmethacrylate.

13. A plastic article comprising a polymerized halogen-containing unsaturated resinous reaction product of a polybasic acid and a polyhydric alcohol, and an adherent, weather-resistant, transparent coating, said coating comprising (1) a material selected from the group consisting of the polymeric forms of acrylic and methacrylic acid esters, polystyrene, polyethylene, polyvinyl chloride, and mixtures thereof and characterized by drying to a transparent, tack-free film, and (2) a 2-hydroxybenzophenone in an amount between about one percent and about fifty percent by weight of said material, said 2-hydroxybenzophenone selected from the group consisting of 2,4-dihydroxybenzophenone; 2,2′,4 - trihydroxy-4′-methoxybenzophenone; 2,2′-dihydroxy-4,4′-dimethoxybenzophenone; 2,2′,4,4′ - tetrahydroxybenzophenone; 2-hydroxy-5-chlorobenzophenone; 2-hydroxy-5,2′-dichlorobenzophenone; 2-hydroxy-5-methyl-2′-chlorobenzophenone; 2-hydroxy-5,3′,4-trichlorobenzophenone; 2-hydroxy-5-methylbenzophenone; 2-hydroxy-2′-chlorobenzophenone; 2-hydroxy-5-chlorobenzophenone - 2′ - carboxylic acid; 2 - hydroxy-4-methoxybenzophenone; 2-hydroxy-4,4′-dimethoxybenzophenone; and 2-hydroxy-4-chlorobenzophenone.

References Cited in the file of this patent

UNITED STATES PATENTS

| | | |
|---|---|---|
| 2,304,466 | Matheson | Dec. 8, 1942 |
| 2,673,826 | Ness | Mar. 30, 1954 |
| 2,693,492 | Hoch | Nov. 2, 1954 |
| 2,725,309 | Rodman | Nov. 29, 1955 |
| 2,773,778 | Hoch | Dec. 11, 1956 |
| 2,777,828 | Day et al. | Jan. 15, 1957 |
| 2,819,247 | Lundberg | Jan. 7, 1958 |
| 2,853,521 | Hardy et al. | Sept. 23, 1958 |